United States Patent
Olabiyi et al.

(10) Patent No.: US 11,705,112 B2
(45) Date of Patent: *Jul. 18, 2023

(54) ADVERSARIAL, LEARNING FRAMEWORK FOR PERSONA-BASED DIALOGUE MODELING

(71) Applicant: Capital One Services, LLC, McLean, VA (US)

(72) Inventors: Oluwatobi Olabiyi, Arlington, VA (US); Alan Salimov, San Bruno, CA (US); Anish Khazane, San Francisco, CA (US); Erik Mueller, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 173 days.

This patent is subject to a terminal disclaimer.

(21) Appl. No.: 17/228,158

(22) Filed: Apr. 12, 2021

(65) Prior Publication Data

US 2021/0233519 A1    Jul. 29, 2021

Related U.S. Application Data

(63) Continuation of application No. 16/560,571, filed on Sep. 4, 2019, now Pat. No. 10,978,051.

(Continued)

(51) Int. Cl.
*G10L 15/16* (2006.01)
*G06N 3/08* (2023.01)
(Continued)

(52) U.S. Cl.
CPC ............. *G10L 15/16* (2013.01); *G06N 3/08* (2013.01); *G10L 15/183* (2013.01); *G10L 15/22* (2013.01)

(58) Field of Classification Search
CPC ....... G10L 15/16; G10L 15/183; G10L 15/22; G10L 2015/223; G10L 15/1822;
(Continued)

(56) References Cited

U.S. PATENT DOCUMENTS 9,799,327 B1 * 10/2017 Chan ..................... G06F 40/12
10,354,182 B2 * 7/2019 Chang ................. G06F 16/951
(Continued)

*Primary Examiner* — Abdelali Serrou
(74) *Attorney, Agent, or Firm* — KDW Firm PLLC

(57) ABSTRACT

Various embodiments may be generally directed to the use of an adversarial learning framework for persona-based dialogue modeling. In some embodiments, automated multi-turn dialogue response generation may be performed using a persona-based hierarchical recurrent encoder-decoder-based generative adversarial network (phredGAN). Such a phredGAN may feature a persona-based hierarchical recurrent encoder-decoder (PHRED) generator and a conditional discriminator. In some embodiments, the conditional discriminator may include an adversarial discriminator that is provided with attribute representations as inputs. In some other embodiments, the conditional discriminator may include an attribute discriminator, and attribute representations may be handled as targets of the attribute discriminator. The embodiments are not limited in this context.

20 Claims, 11 Drawing Sheets

Related U.S. Application Data

(60) Provisional application No. 62/737,089, filed on Sep. 26, 2018.

(51) Int. Cl.
*G10L 15/183* (2013.01)
*G10L 15/22* (2006.01)

(58) Field of Classification Search
CPC ... G10L 15/30; G10L 2015/088; G10L 21/00; G10L 2015/225; G10L 15/063; G10L 25/30; G10L 15/01; G10L 15/18; G10L 2015/228; G10L 25/27; G06N 3/08; G06T 2207/20081; G06T 2207/20084; G06F 16/3344; G06F 16/3329; G06F 40/35; G06F 40/30
See application file for complete search history.

(56) References Cited

U.S. PATENT DOCUMENTS

| | | | |
|---|---|---|---|
| 10,379,995 B1* | 8/2019 | Walters | G06F 16/2237 |
| 11,482,212 B2* | 10/2022 | Kim | G10L 15/1815 |
| 2017/0161256 A1* | 6/2017 | Hori | G10L 15/26 |
| 2018/0005631 A1* | 1/2018 | Lee | G10L 15/08 |
| 2018/0047406 A1* | 2/2018 | Park | G10L 15/22 |
| 2018/0336880 A1* | 11/2018 | Arik | G10L 15/063 |
| 2019/0114348 A1* | 4/2019 | Gao | G06F 16/334 |
| 2019/0295545 A1* | 9/2019 | Andreas | G10L 15/1815 |
| 2019/0341058 A1* | 11/2019 | Zhang | G10L 17/10 |

\* cited by examiner

300

600

FIG. 7
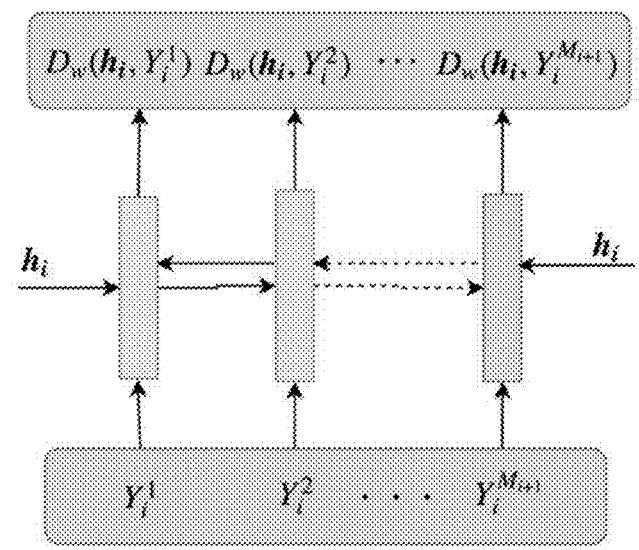
700
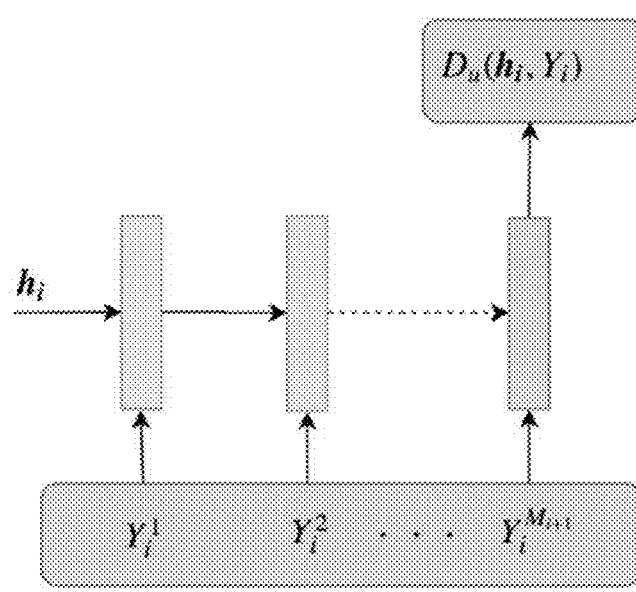
750

Adversarial Learning of phredGAN

---

A generator $G$ with parameters $\theta_G$.
An adversarial discriminator $D_{att}$ with parameters $\theta_{D_{adv}}$.
An attribute discriminator $D_{att}$ with $\theta_{D_{att}}$.
Training hyperparameters, $isTarget$, $\lambda_{G_{att}}$, $\lambda_{G_{adv}}$, and $\lambda_M$.
for number of training iterations do
Initialize $cRNN$ to zero_state, $h_0$
Sample a mini batch of conversations, $X = \{X_i\}_{i=1}^N$, $X_i = (X_1, X_2, ... X_i)$ with N utterances. Each utterance mini batch $i$ contains $M_i$ word tokens.
    for $i = 1$ to $N - 1$ do
        Update the context state.
        $h_i = cRNN\left(eRNN(E(X_i)), h_{i-1}\right)$
        Compute the generator output:
        $P_{\theta_G}(Y_i|, Z_i, X_i) = \{P_{\theta_G}(Y_i^j | X_{i+1}^{1:j-1}, Z_i^j, X_i)\}_{j=1}^{M_{i+1}}$
        Sample a corresponding mini batch of utterance $Y_i$,
        $Y_i \sim P_{\theta_G}(Y_i|, Z_i, X_i)$
    end for
    Compute the adversarial discriminator accuracy $D_{adv}^{acc}$ over $N - 1$ utterances
    $\{Y_i\}_{i=1}^{N-1}$ and $\{X_{i+1}\}_{i=1}^{N-1}$
    if $isTarget$ then
        Update $phredGAN_d$'s $\theta_{D_{adv}}$ and $\theta_{D_{att}}$.
        $\sum_i \left[\nabla_{\theta_{D_{adv}}} \log(D_{adv}(h_i, C_{i+1}, X_{i+1})) + \nabla_{\theta_{D_{adv}}} \log(1 - D_{adv}(h_i, C_{i+1}, Y_i))\right]$
    end if
end if
if $(D_{adv})^{acc} < acc_{G_{th}}$ then
    Update $\theta_G$ with the generator's MLE loss only.
    $\sum_i \left[\nabla_{\theta_G} \log P_{\theta_G}(Y_i|, Z_i, X_i)\right]$
else
    Update $\theta\_G$ with attribute, adversarial and MLE losses.
    $\sum_i \left[\lambda_{G_{att}} \nabla_{\theta_G} \log D_{att}(h_i, Y_i) + \lambda_{G_{adv}} \nabla_{\theta_G} \log D_{adv}(h_i, C_{i+1}, Y_i) + \lambda_M \nabla_{\theta_G} \log P_{\theta_G}(Y_i|, Z_i, X_i)\right]$
end if
end for

*FIG. 9*

Storage Medium 900

*Computer Executable Instructions for Performing Automated Multi-Turn Dialogue Response Generation Using phredGAN*
*902*

ADVERSARIAL, LEARNING FRAMEWORK FOR PERSONA-BASED DIALOGUE MODELING

RELATED APPLICATION

This application is a continuation of U.S. application Ser. No. 16/560,571, filed Sep. 4, 2019, which claims priority to U.S. Provisional Application No. 62/737,089, filed Sep. 26, 2018, both entitled ADVERSARIAL LEARNING FRAMEWORK FOR PERSONA-BASED DIALOGUE MODELING, the entire contents of which are incorporated herein by reference.

TECHNICAL FIELD

Embodiments described herein generally relate to dialogue modeling and automated dialogue generation.

BACKGROUND

Recent advances in machine learning especially with deep neural networks has led to tremendous progress in natural language processing and dialogue modeling research. Nevertheless, developing a good conversation model capable of fluent interaction between a human and a machine is still in its infancy stage. Most existing work relies on limited dialogue history to produce response with the assumption that the model parameters will capture all the modalities within a dataset. However, this is not true as dialogue corpora tend to be strongly multi-modal and practical neural network models find it difficult to disambiguate characteristics such as speaker personality, location and sub-topic in the data.

Most work in this domain has primarily focused on optimizing dialogue consistency. For example, a Hierarchical Recurrent Encoder-Decoder (HRED) network architecture has been introduced that combines a series of recurrent neural networks to capture long-term context state within a dialogue. However, the HRED system suffers from lack of diversity and does not have any guarantee on the generator output since the output conditional probability is not calibrated. One approach to addressing these problems may involve training a modified HRED generator alongside an adversarial discriminator in order to increase diversity and provide a strong and calibrated guarantee to the generator's output. While the hredGAN system improves upon response quality, it does not capture speaker and other attributes modality within a dataset and fails to generate persona specific responses in datasets with multiple modalities.

On the other hand, there has been some recent work on introducing persona into dialogue models. For example, one approach integrates attribute embeddings into a single turn (Seq2Seq) generative dialogue model. According to another approach, the attributes are a set of sentences describing the profile of the speaker. In this case, the attributes representation is not learned. The system however learns how to attend to different parts of the attributes during training. Still, the above persona-based models have limited dialogue history (single turn); suffer from exposure bias worsening the trade-off between personalization and conversation quality and cannot generate multiple responses given a dialogue context. This is evident in the relatively short and generic responses produced by these systems, even though they generally capture the persona of the speaker.

BRIEF DESCRIPTION OF THE DRAWINGS

FIG. 7 illustrates an embodiment of a word-level adversarial discriminator and an embodiment of an utterance-level attribute discriminator.

FIG. 8 illustrates an embodiment of a training algorithm.

FIG. 9 illustrates an embodiment of a storage medium.

DETAILED DESCRIPTION

Various embodiments may be generally directed to the use of an adversarial learning framework for persona-based dialogue modeling. In some embodiments, automated multi-turn dialogue response generation may be performed using a persona-based hierarchical recurrent encoder-decoder-based generative adversarial network (phredGAN). Such a phredGAN may feature a persona-based hierarchical recurrent encoder-decoder (PHRED) generator and a conditional discriminator. In some embodiments, the conditional discriminator may include an adversarial discriminator that is provided with attribute representations as inputs. In some other embodiments, the conditional discriminator may include an attribute discriminator, and attribute representations may be handled as targets of the attribute discriminator. The embodiments are not limited in this context.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
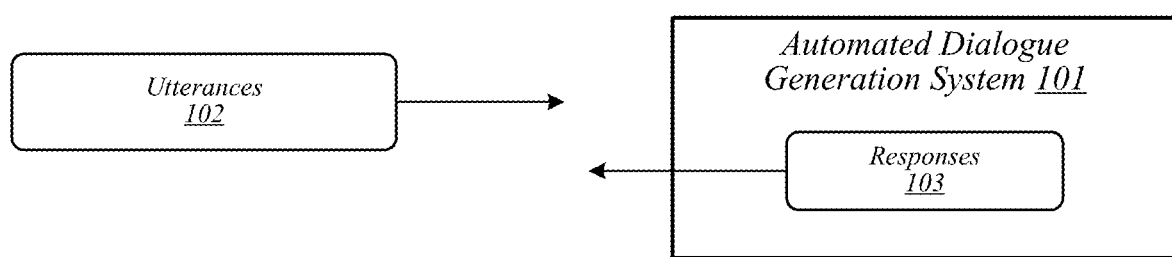
FIG. 1 illustrates an embodiment of a first operating environment.

FIG. 1 illustrates an example of an operating environment 100 that may be representative of various embodiments. In operating environment 100, an automated dialogue generation system 101 is generally operative to perform automated multi-turn dialogue response generation. In conjunction with such automated multi-turn dialogue response generation, automated dialogue generation system 101 may receive utterances 102, and may send responses 103 in response to such utterances 102.

Figure 2:
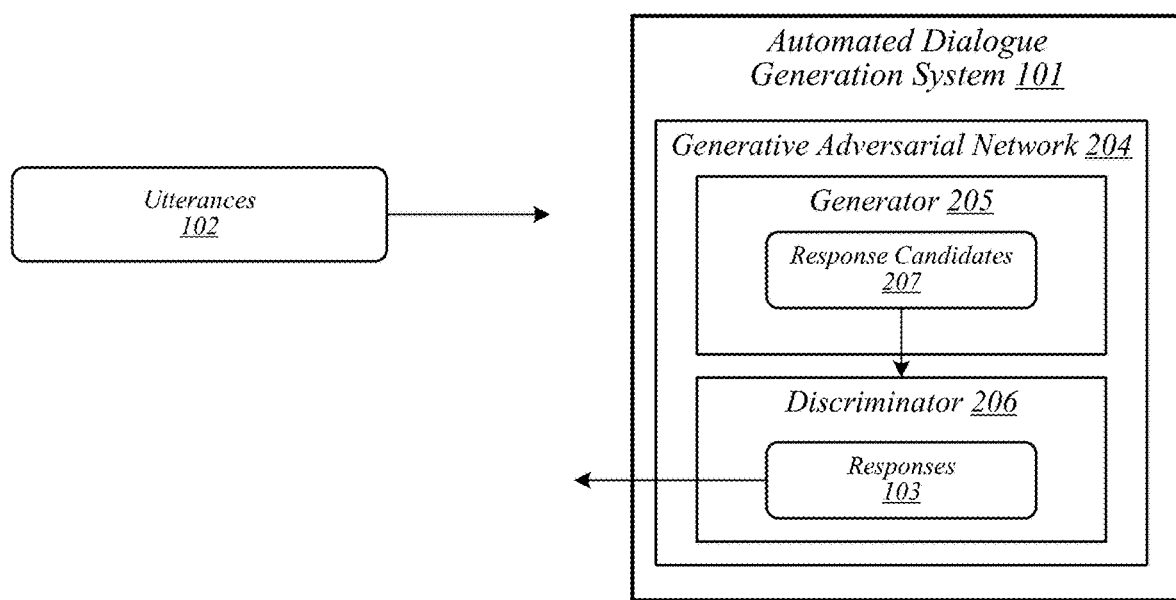
FIG. 2 illustrates an embodiment of a second operating environment.

FIG. 2 illustrates an example of an operating environment 200 that may be representative of some embodiments. In operating environment 200, automated dialogue generation system 101 is implemented using a generative adversarial network (GAN) 204, which comprises generator 205 and discriminator 206. In conjunction with multi-turn dialogue response generation, generator 205 may be operative to generate response candidates 207 based on utterances 102. Discriminator 206 may be operative to evaluate response candidates 207, from among which may be selected the responses 103 to be sent in response to utterances 102.

Figure 3:
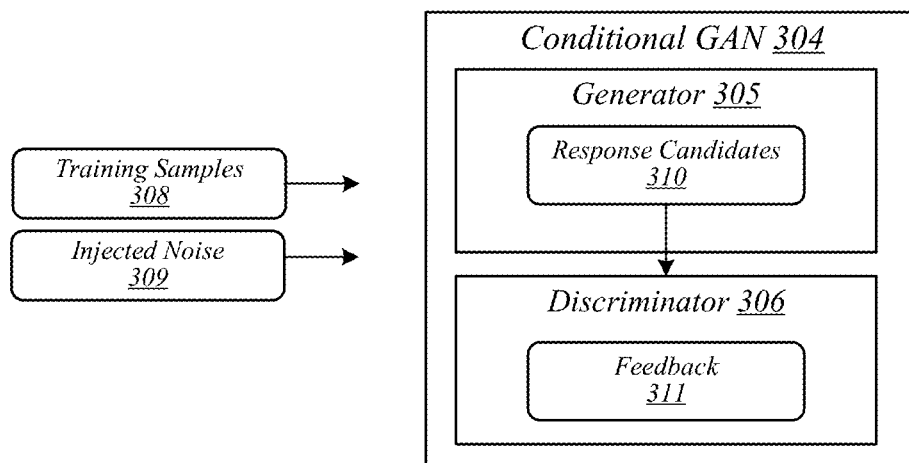
FIG. 3 illustrates an embodiment of a third operating environment.

FIG. 3 illustrates an example of an operating environment 300 that may be representative of various embodiments. In operating environment 300, a conditional GAN 304 comprising a generator 305 and a discriminator 306 may serve as the generative adversarial network 204 depicted in FIG. 2. In order to improve the quality of multi-turn dialogue response generation, conditional GAN 304 may use a training procedure to train generator 305 and discriminator 306. According to the training procedure, generator 305 may generate response candidates 310 based on training samples 308 and injected noise 309. Discriminator 306 may evaluate response candidates 310 based on training samples 308 and injected noise 309, and may provide generator 305 with feedback 311. By updating one or more response generation parameters based on feedback 311, generator 305 may be able to improve the quality of subsequently generated response candidates. In conjunction with evaluating response candidates 310, discriminator 306 may be able to identify updates to be made to one or more discrimination parameters in order to improve its ability to select the highest quality responses from among response candidates generated by generator 305.

Figure 4:
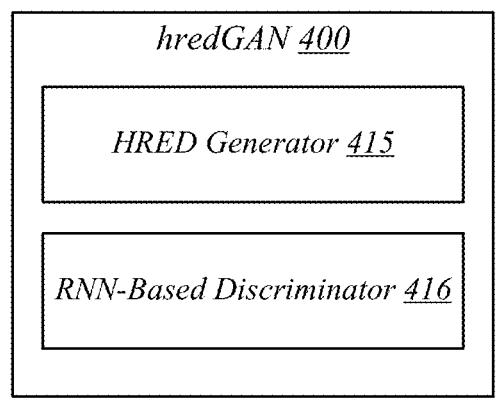
FIG. 4 illustrates an embodiment of a hierarchical recurrent encoder-decoder-based GAN (hredGAN).

FIG. 4 illustrates an example of a hierarchical recurrent encoder-decoder-based GAN (hredGAN) 400 that may be used to implement conditional GAN 304 of FIG. 3. As shown in FIG. 4, hredGAN 400 features a hierarchical recurrent encoder-decoder (HIRED) generator 415 and a recurrent neural network (RNN)-based discriminator 416, which respectively serve as generator 305 and discriminator 306 of FIG. 3.

hredGAN 400 embodies a framework that formulates multi-turn dialogue response generation as: given a dialogue history comprising a sequence of utterances, $X_i=(X_1, X_2, \ldots, X_i)$, where each utterance $X_i=(X_i^1, X_i^2, \ldots X_i^{M_i})$ contains a variable-length sequence of $M_i$ word tokens such that $X_i^j \in V$ for vocabulary V, the dialogue model produces an output $Y_i=(Y_i^1, Y_i^2, \ldots Y_i^{T_i})$, where $T_i$ represents the number of generated tokens and $T_i=M_{i+1}$. The framework uses a conditional GAN structure to learn a mapping from an observed dialogue history to a sequence of output tokens. The generator, G, is trained to produce sequences that cannot be distinguished from the ground truth by an adversarial trained discriminator, D akin to a two-player min-max optimization problem. The generator is also trained to minimize the cross-entropy loss $\mathcal{L}_{MLE}(G)$ between the ground truth $X_{i+1}$, and the generator output $Y_i$. The optimization objective reflected in Equation (1) below summarizes both goals:

$$G^*, D^* = \arg\min_G \max_D (\lambda_G \mathcal{L}_{cGAN}(G, D) + \lambda_M \mathcal{L}_{MLE}(G)) \quad (1)$$

where $\lambda_G$ and $\lambda_M$ are training hyperparameters and $\mathcal{L}_{cGAN}(G,D)$ and $\mathcal{L}_{MLE}(G)$ are defined in Equations (2) and (3) below. In this context, the generator G and discriminator D share the same encoder and embedding representation of the word tokens.

$$\mathcal{L}_{cGAN}(G,D) = \mathbb{E}_{X_i,X_{i+1}}[\log D(X_{i+1},X_i)] + \mathbb{E}_{X_i,Z_i}[1-\log D(X_i,G(X_i,Z_i))] \quad (2)$$

$$\mathcal{L}_{MLE}(G) = \mathbb{E}_{X_i,X_{i+1},Z_i}[-\log P_{\theta_G}(X_{i+1},X_i,Z_i)] \quad (3)$$

One challenge presented by the use of a GAN such as conditional GAN 304 or hredGAN 400 is the problem of mode collapse, where the model generator produces responses from a small part of data distribution that score well by the discriminator. This results in less diverse generator output, as it does not capture the entire data distribution. This problem is exacerbated in the context of adversarially trained dialogue modeling, since (i) the generator outputs are sequentially generated, and; (ii) dialogue data is strongly multimodal across speaker style, dialogue (sub) topic, speaker demography, speaker interest and other utterance attributes. In order to address the problem of mode collapse, it may be desirable that conditional GAN 304 be implemented using a framework that captures utterance attributes.

Figure 5:
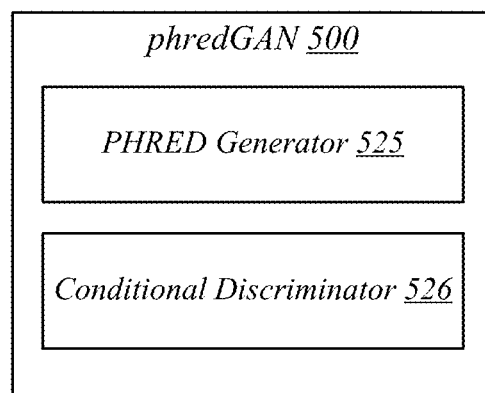
FIG. 5 illustrates an embodiment of a persona-based hierarchical recurrent encoder-decoder-based GAN (phredGAN).

FIG. 5 illustrates an example of a persona-based hierarchical recurrent encoder-decoder-based GAN (phredGAN) 500 that embodies such a framework. phredGAN 500 may feature an architecture that is generally representative of an hredGAN architecture modified to simultaneously capture utterance attributes such as speaker identity, dialogue topic, speaker sentiments, and so on. As shown in FIG. 5, phredGAN 500 features a persona-based hierarchical recurrent encoder-decoder (PHRED) generator 525 and a conditional discriminator 526, which respectively serve as generator 305 and discriminator 306 of FIG. 3.

Multi-turn dialogue response generation in phredGAN 500 may be formulated in similar fashion to that in hredGAN 400, but taking speaker and/or utterance attributes into account. Namely, the dialogue history serving as basis for multi-turn dialogue response generation using phredGAN 500 may take the form $X_i=((X_1, C_1), (X_2, C_2), \ldots (X_i, C_i))$ where $C_i$ is additional input that represents the speaker and/or utterance attributes. $C_i$ can either be a sequence of tokens or single token such that $C_i^j \in V_c$ for vocabulary $V_c$. At the ith turn, $C_i$ and $C_{i+1}$ are the source/input attributes, such as speaker's identity, speaker's background, speaker's location, speaker's preference and so on, and target/output attributes, such as responder's identity, responder's background, responder's location, responder's preference and so on, to the generator, respectively. The embedding for attribute tokens is also learned similar to that of word tokens.

In one example, assume there is dialogue data with conversations involving customers of different demographics such as age, location and so on, and service agents of different areas of expertise. When a model, such as hredGAN, is trained on data but does not use persona/attributes as in the example embodiments, the model may only be capable of generating responses by an average agent to an average customer. But with a phredGAN of the example embodiments, trained with persona/attribute information, the dialogue generating model can generate responses that are more appropriate for a specific user group. This inherently increases the response diversity since it is no longer an average response. Below illustrates an example dialogue with two different responses based on utilization of hredGAN vs. an exemplary phredGAN:

Customer 1: A 21 year old college student living in California.
　Agent: A Card customer service agent.
　Conversation:
　Customer: Hey, I have a problem with my credit card, my transactions are getting declined.
　hredGAN response: Hello there! let me take a at your account and check that for you.
　phredGAN response: Hello, I'm sorry you are having to deal with this issue considering you need to focus on other things in school. Let me take a look and I will take care of this right away.

In the above example, a model based on phredGAN is aware of customer persona/attributes, and thus the model is able to generate responses that are more specific to the customer. A hredGAN model on the other hand may generate generally good responses but not particular to the customer's persona/attributes, etc.

Conditioning on external attributes can be seen as another input modality as is the utterance into the underlying system. The attribute representation is an embedding that is learned together with the rest of model parameters. Injecting attributes into the multi-turn dialogue system may allow the model to learn how to generate responses conditioned on particular attribute(s) across conversation turns. Since the attributes are discrete, it also may allow for exploring different what-if scenarios of model responses.

In some embodiments, phredGAN 500 may perform persona-based dialogue modeling using a dialogue model according to which attributes are handled as discriminator inputs. As employed herein, the term phredGAN$_a$ denotes a phredGAN that performs persona-based dialogue modeling using such a dialogue model. In embodiments in which phredGAN 500 constitutes a phredGAN$_a$, attribute representations may serve as inputs to an adversarial discriminator comprised in conditional discriminator 526. More particularly, conditional discriminator 526 may include a word-level adversarial discriminator $D_{adv}$, the inputs to which may include $C_{i+1}$ during an ith turn of a multi-turn dialogue response generation process.

In various embodiments, phredGAN 500 may perform persona-based dialogue modeling using a dialogue model according to which attributes are handled as discriminator targets. As employed herein, the term phredGAN$_d$ denotes a phredGAN that performs persona-based dialogue modeling using such a dialogue model. In embodiments in which phredGAN 500 constitutes a phredGAN$_d$, attribute representations may constitute targets of an attribute discriminator comprised in conditional discriminator 526. As in the phredGAN$_a$ case, conditional discriminator 526 may include word-level adversarial discriminator $D_{adv}$. However, in the phredGAN$_d$ case, conditional discriminator 526 may additionally include an utterance-level attribute discriminator $D_{att}$. Rather than serving as input to $D_{adv}$ during the ith turn, $C_{i+1}$ may constitute the target of $D_{att}$.

Figure 6:
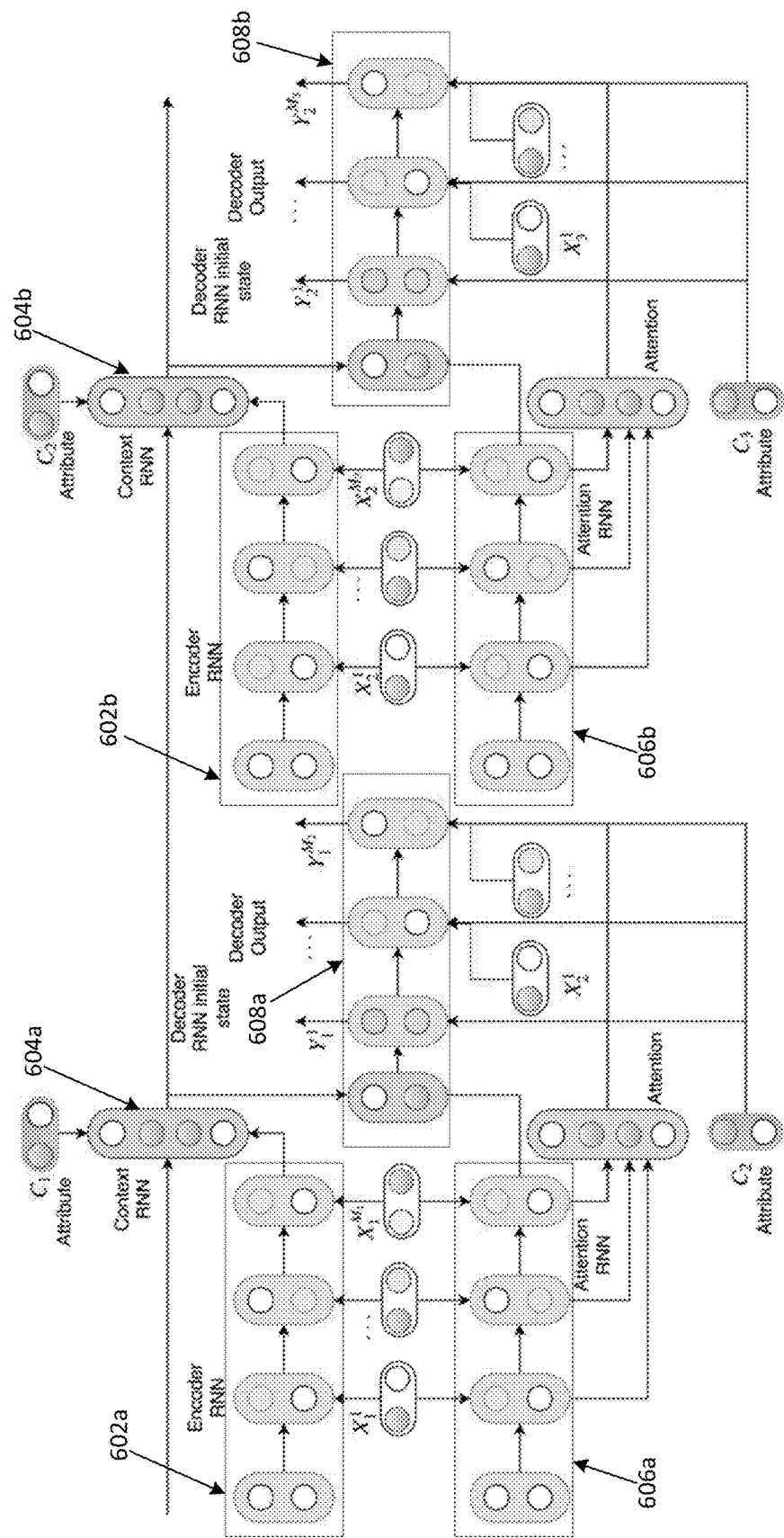
FIG. 6 illustrates an embodiment of a generator architecture.

FIG. 6 illustrates a generator architecture 600 that may be representative of PHRED generator 525 of FIG. 5 according to some embodiments. Embodiments in which generator architecture 600 is representative of PHRED generator 525 may include both embodiments in which phredGAN 500 is a phredGAN$_a$ and embodiments in which phredGAN 500 is a phredGAN$_d$. Generator architecture 600 may represent an HRED generator architecture that is modified to include utterance attribute representations at its encoder and decoder inputs.

Generator architecture 600 features encoder RNNs (eRNN) 602a, 602b, context RNNs (cRNN) 604a, 605b, attention RNNs (aRNN), 606a, 606b, and decoder RNNs (dRNN, 608a, 608b). cRNN 604 takes the source attribute $C_i$ as an additional input by concatenating its representation with the output of eRNN 602. If the attribute $C_i$ is a sequence of tokens, then an attention (using the output of eRNN 602) over the source attribute representations is concatenated with the output of eRNN 602. This output is used by the generator to create a context state for turn i. dRNN 608 takes the target attribute $C_{i+1}$ as an additional input. If the attribute $C_{i+1}$ is a sequence of tokens, then an attention (using the output of dRNN 608) over the attribute representations is concatenated with the rest of the decoder inputs. This forces the generator to draw a connection between the generated responses and the utterance attributes such as speaker identity. Generated responses can have two discrimination metrics, human-likeness and persona. Using target attributes as a discriminator input combines the discrimination metrics into a single discrimination metric. On the other hand, using target attributes as a discriminator target, the discrimination metrics may be treated separately.

FIG. 7 illustrates a word-level adversarial discriminator 700 that may be representative of a word-level adversarial discriminator $D_{adv}$ comprised in conditional discriminator 526 of FIG. 5 according to various embodiments. Such embodiments may include both embodiments in which phredGAN 500 is a phredGAN$_a$ and embodiments in which phredGAN 500 is a phredGAN$_d$. As reflected in FIG. 7, based on dialogue history $h_i$ and generator outputs $Y_i^1$ ... $Y_i^{M_{i+1}}$, word-level adversarial discriminator 700 produces word-level outputs $D_w(h_i, Y_i^1) \ldots D_w(h_i, Y_i^{M_{i+1}})$. FIG. 7 also illustrates an utterance-level attribute discriminator 750 that may be representative of an utterance-level attribute discriminator $D_{att}$ comprised in conditional discriminator 526 of FIG. 5 in some embodiments in which phredGAN 500 is a phredGAN$_d$. As reflected in FIG. 7, based on dialogue history $h_i$ and generator outputs $Y_i^1 \ldots Y_i^{M_{i+1}}$, utterance-level attribute discriminator 750 produces utterance-level output $D_u(h_i, Y_i)$. In some embodiments, rather than word-level adversarial discriminator 700, an utterance-level discriminator could be used as an adversarial discriminator in conditional discriminator 526. Such an utterance-level discriminator may be similar to utterance-level attribute discriminator 750.

Returning to FIG. 5, the optimization objective of phredGAN 500 may be expressed by Equation (4) as follows:

$$G^*, D^*_{adv}, D^*_{att} = \arg\min_G \left( (\max_{D_{adv}} \lambda_{G_{adv}} \mathcal{L}^{adv}_{cGAN}(G, D_{adv}) + \min_{D_{att}} \lambda_{G_{att}} \mathcal{L}^{att}_{cGAN}(G, D_{att}) + \lambda_M \mathcal{L}_{MLE}(G) \right) \quad (4)$$

where $\mathcal{L}_{cGAN}^{adv}(G, D_{adv})$ and $\mathcal{L}_{cGAN}^{att}(G, D_{att})$ are the adversarial and attribute prediction loss respectively and dependent on the architectural variation. While $\mathcal{L}_{cGAN}^{adv}(G, D_{adv})$ is adversarial in nature, $\mathcal{L}_{cGAN}^{att}(G, D_{att})$ is collaborative in nature. The maximum likelihood estimation (MLE) loss $\mathcal{L}_{MLE}(G)$ is common and can be expressed by Equation (5) as follows:

$$\mathcal{L}_{MLE}(G) = \mathbb{E}_{X_{i+1}}[-\log P_G(X_{i+1}|X_i, C_{i+1}, Z_i)] \quad (5)$$

where noise sample $Z_i$ depends on a choice of either utterance-level or word-level noise input into the generator.

In embodiments in which phredGAN 500 is a phredGAN$_a$ and thus does not implement attribute prediction, $\lambda_{G_{att}}$ is equal to 0. The adversarial loss $\mathcal{L}_{cGAN}^{adv}(G,D_{adv})$ can then be expressed by Equation (6) as follows:

$$\mathcal{L}_{cGAN}^{adv}(G, D_{adv}) = \mathbb{E}_{X_i,C_{i+1},X_{i+1}}[\log D_{adv}(X_i, C_{i+1}, X_{i+1})] + \quad (6)$$
$$\mathbb{E}_{X_i,C_{i+1},Z_i}[1 - \log D_{adv}(X_i, C_{i+1}, G(X_i, C_{i+1}, Z_i))]$$

The addition of speaker or utterance attributes allows the dialogue model to exhibit personality traits given consistent responses across style, gender, location, and so on.

In embodiments in which phredGAN 500 is a phredGAN$_d$ and thus uses attributes as the target for attribute discriminator D$_{att}$, the adversarial and attribute prediction losses can be respectively expressed by Equations (7) and (8) as follows:

$$\mathcal{L}_{cGAN}^{adv}(G, D_{adv}) = \quad (7)$$
$$\mathbb{E}_{X_i,X_{i+1}}[\log D_{adv}(X_i, X_{i+1})] + \mathbb{E}_{X_i,Z_i}[1 - \log D_{adv}(X_i, G(X_i, C_{i+1}, Z_i))]$$
$$\mathcal{L}_{cGAN}^{att}(G, D_{att}) = \mathbb{E}_{C_{i+1}}[\log D_{att}(C_{i+1} \mid X_i, X_{i+1})] + \quad (8)$$
$$\mathbb{E}_{C_{i+1}}[\log D_{att}(C_{i+1} \mid X_i, G(X_i, C_{i+1}, Z_i))]$$

Attribute discriminator D$_{att}$ may discriminate on an utterance level to capture attribute modalities since attributes are assigned at utterance level. In various embodiments, attribute discriminator D$_{att}$ may be implemented using a unidirectional RNN D$_{attRNN}$ that maps the input utterance to the particular attribute(s) that generated it. The attributes can be seen as hidden states that inform or shape the generator outputs. In such embodiments, attribute discriminator D$_{att}$ can be described by Equation (9) as follows:

$$D_{att}(C_{i+1} \mid X_i, \chi) = D_{attRNN}(h_i, E(\chi)) \quad (9)$$

where $E(\cdot)$ represents the word embedding lookup, $\chi = X_{i+1}$ for ground truth and $\chi = Y_i$ for the generator output.

Both the PHRED generator 525 and the conditional discriminator 526 (with shared encoder) of phredGAN 500 may be trained using a training procedure characterized by training algorithm 800 of FIG. 8. Both in embodiments in which phredGAN 500 is a phredGAN$_a$ and in embodiments in which phredGAN 500 is a phredGAN$_d$, $\lambda_{G_{adv}} = 1$. In the phredGAN$_a$ case, $\lambda_{G_{att}} = 0$, while in the phredGAN$_d$ case, $\lambda_{G_{att}} = 1$. Since the encoder, word embedding and attribute embedding are shared, the system may be trained end-to-end with back-propagation.

In a given embodiment in which PHRED generator 525 and the conditional discriminator 526 are trained using a training procedure characterized by training algorithm 800, each RNN unit of phredGAN 500 may be implemented as a 3-layer gate recurrent unit (GRU) cell with a hidden state size of 512. The encoder RNN (eRNN) may be bidirectional, while the context RNN (cRNN) may be unidirectional. A word vocabulary size V of 50,000 may be used, with a word embedding size of 512. An attribute embedding size of 512 may be used. The number of attributes V$_c$ may be dataset dependent. Only one attribute may be used per utterance so that there is no need to use attention to combine the attribute embeddings. The attention RNN (aRNN) outputs may be connected to the decoder RNN (dRNN) input using an additive attention mechanism.

Word-level adversarial discriminator D$_{adv}$ may be implemented using a bidirectional RNN D$_{RNN}$, the units of which may comprise 3-layer GRU cells with hidden state sizes of 512. The output of both the forward and the backward cells for each word may be concatenated and passed to a fully-connected layer with binary output. The output is the probability that the word is from the ground truth given the past and future words of the sequence, and in the phredGAN$_a$ case, the responding speaker's embedding. Attribute discriminator D$_{att}$ may be implemented using a unidirectional RNN D$_{attRNN}$, the units of which may comprise 3-layer GRU cells with hidden state sizes of 512. A softmax layer may then be applied to project the final hidden state to a pre-specified number of attributes, V$_c$. The output is the probability distribution over the attributes.

All parameters may be initialized with Xavier uniform random initialization, for example. Due to the large word vocabulary size, sampled softmax loss may be used for MLE loss to expedite the training process. However, full softmax may be used for model evaluation. For both systems, parameters updates may be conditioned on the word-level discriminator accuracy performance with $acc_{D_{adv}}^{th} = 0.99$ and $acc_{G_{th}} = 0.75$. The model may be trained end-to-end using the stochastic adv gradient descent algorithm. Finally, the model may be implemented, trained, and evaluated using the TensorFlow deep learning framework.

In conjunction with model inference, for the modified noise sample, a linear search for $\alpha$ may be performed with sample size L=1 based on the average word-level discriminator loss, $-\log D_{adv}(G(\cdot))$ using trained models run in autoregressive mode to reflect performance in actual deployment. The optimum value may then be used for all inferences and evaluations. During inference, the dialogue response generation may be conditioned on the encoder outputs, noise samples, word embedding and the attribute embedding of the intended responder. With multiple noise samples, L=64, the generator outputs may be ranked by the discriminator which may also be conditioned on encoder outputs and the intended responder's attribute embedding. The final response may be the response ranked highest by the discriminator. In the phredGAN$_d$ case, the confidences produced by D$_{adv}$ and D$_{att}$ may be averaged.

The use of a phredGAN such as phredGAN 500 for multi-turn response generation based on an adversarially trained dialogue model may address the problem of mode collapse while providing consistent personality traits. Use of the phredGAN may yield benefits in both supervised and unsupervised use cases. In a supervised use case, multi-modal attributes such as speaker name/identity and dialogue subtopic may be available along with dialogue utterances, and the dialogue model output response may be improved by conditioning the response generation on these attributes. During dialogue response generation, the model can generate responses consistent with the speaker persona or other utterance attributes within a conversation discourse. Moreover, conditioning on multiple attributes may allow the model to explore different what-if scenarios given a dialogue history. The discriminator may produce the likelihood that the generated response comes from the correct attribute and can be either one vs. all or multi-label classification. For the case of one vs. all, the attribute may be combined with the utterance at the input of the discriminator which may then produce a binary classification as in traditional GAN system. In case of multi-label classification, the attribute may not be provided at the input of the discriminator, but an additional multi-label classifier may be trained to assign the utterance to the correct attribute class. Here, the discriminator may yield one binary (fake/real) output and one attribute class output.

In an unsupervised use case, the dialogue corpus may not contain attributes. However, attributes may still be generated by a trained neural network (policy generator) or random sampling for the purpose of overcoming the mode collapse problem and improving the diversity of dialogue response. During response generation, the generator may be conditioned on different attribute classes to produce more diverse responses. The discriminator in this case is a multi-label classifier combined with a traditional GAN discriminator.

Figure 10:
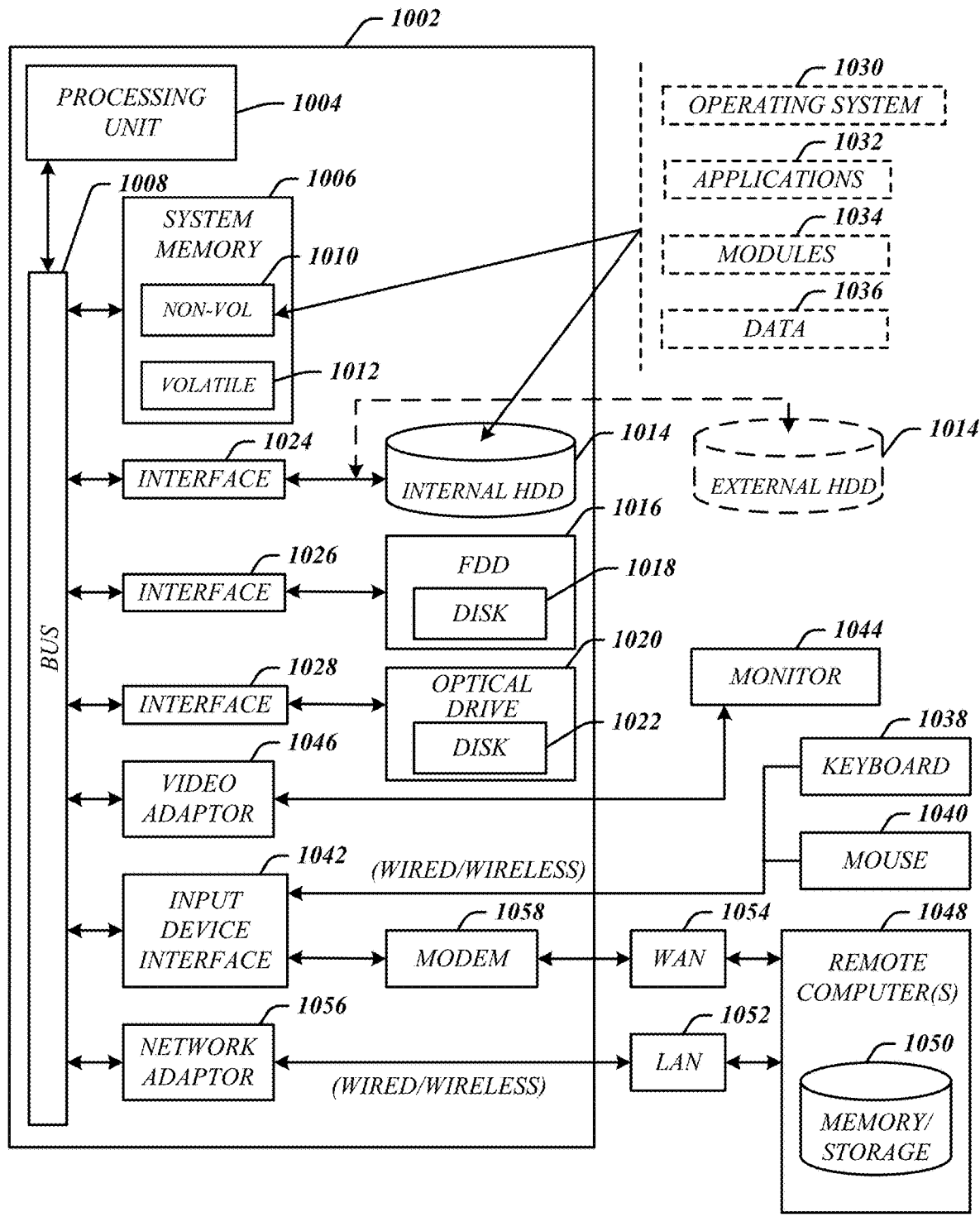
FIG. 10 illustrates an embodiment of a computing architecture.

FIG. 10 illustrates an embodiment of an exemplary computing architecture 1000 that may be suitable for implementing an apparatus, system, and/or method for performing automated multi-turn dialogue response generation using a phredGAN. In various embodiments, the computing architecture 1000 may comprise or be implemented as part of an electronic device. In some embodiments, the computing architecture 1000 may be representative, for example, of a server that implements phredGAN 500 of FIG. 5. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the apparatus 600.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
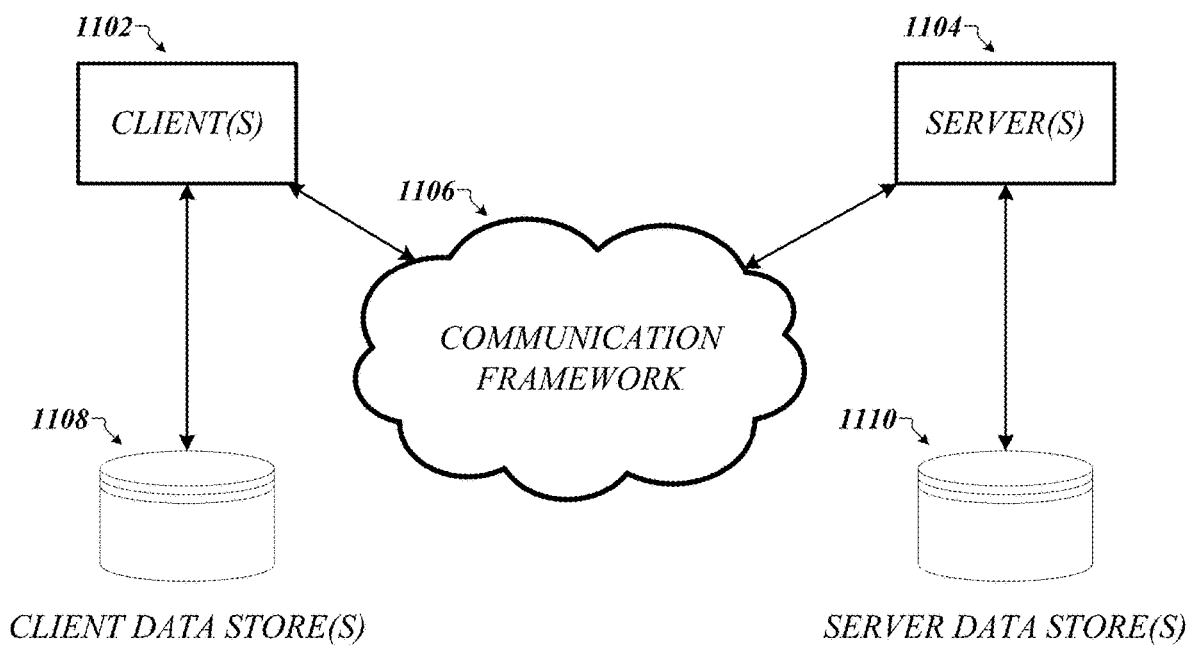
FIG. 11 illustrates an embodiment of a communications architecture.

FIG. 11 illustrates a block diagram of an exemplary communications architecture 1100 that may be suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 and the servers 1104 are operatively connected to one or more respective client data stores 1108 and server data stores 1110 that can be employed to store information local to the respective clients 1102 and servers 1104, such as cookies and/or associated contextual information. In various embodiments, any one of servers 1104 may use a phredGAN such as phredGAN 500 of FIG. 5 to perform automated multi-turn dialogue response generation, based on data received from any one of clients 1102 on any of server data stores 1110.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, novel subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
a generative adversarial network having
generator logic, the generator logic including:
a context recurrent neural network (cRNN),
an encoder recurrent neural network (eRNN),
an attention recurrent neural network (aRNN), and
and a decoder recurrent neural network (dRNN); and
discriminator logic coupled to the generator logic;
a network interface coupled to the generative adversarial network, wherein the network interface is configured to receive a dialogue utterance from a device external to the system; and
processing circuitry configured to implement the generator logic and the discriminator logic and coupled to the network interface, wherein the generator logic and the discriminator logic that when executed cause the processing circuitry to:
receive, via the network interface, the dialogue utterance;
generate, using the generator logic, response candidates responsive to the dialogue utterance, wherein:
the cRNN is applied to concatenate a source attribute with an output of the eRNN to generate an initial state for the dRNN, and
the dRNN generates the response candidates based on the initial state;
determine, using the discriminator logic, a response to the dialogue utterance from the response candidates; and
output, via the network interface, the response to the dialogue utterance to a user device.

2. The system of claim 1, wherein the generator logic when executed by the processing circuitry is further configured to:
receive training samples and injected noise;
provide feedback related to one or more response generation parameters;
update the one or more response generation parameters in the generator logic;
generate, based on the updated one or more response generation parameters, the response candidates based on the dialogue utterances; and
provide the generated response candidates to the discriminator logic.

3. The system of claim 1, wherein an output of the aRNN is coupled to the dRNN using an additive attention mechanism.

4. The system of claim 1, wherein the eRNN is a bidirectional recurrent neural network (RNN) and the cRNN is a unidirectional RNN, and each of the eRNN and THE cRNN includes a three-layer gate recurrent unit (GRU) with a hidden state size of 512.

5. The system of claim 1, wherein the discriminator logic further comprises:
a word-level adversarial discriminator that is configured to determine the response to a word in the dialogue utterance.

6. The system of claim 5, wherein the word-level adversarial discriminator is a bidirectional RNN having a gate recurrent unit (GRU).

7. The system of claim 5, wherein when determining a response by the discriminator logic, the discriminator logic includes:
obtain outputs of a forward cell and a backward cell of the word-level adversarial for each word;
concatenate the outputs of the forward cell and the backward cell; and
pass the concatenated outputs to a fully-connected layer having binary output, wherein the binary output is a probability that the word is from a ground truth given a past word and a future word of a sequence of words.

8. The system of claim 1, wherein the network interface is configured to:
receive dialogue utterances via a wired or a wireless communication with a client device.

9. A non-transitory, computer-readable medium storing instructions that, when executed, cause one or more processors of one or more servers to implement generator logic and discriminator logic of a generative adversarial network:
generate, using the generator logic of the generative adversarial network, response candidates responsive to a dialogue utterance, wherein the generator logic of the generative adversarial network includes a context recurrent neural network (cRNN), an encoder recurrent neural network (eRNN), an attention recurrent neural network (aRNN), and a decoder recurrent neural network (dRNN), the cRNN utilizes an output of the eRNN to generate an initial state for the dRNN, and the dRNN is applied to generate the response candidates based on the initial state;
determine, via the discriminator logic, a response to the dialogue utterance from the response candidates; and
output, via a network interface, the response to the dialogue utterance to a user device.

10. The non-transitory, computer-readable medium of claim 9, wherein the instructions that, when executed, further cause the one or more processors of the one or more servers to:
receive training samples and injected noise;
provide feedback related to one or more response generation parameters;
update the one or more response generation parameters in the generator logic;
generate, based on the updated one or more response generation parameters, the response candidates based on the dialogue utterance; and
provide the generated response candidates to the discriminator logic.

11. The non-transitory, computer-readable medium of claim 9, wherein logic of the eRNN is a bidirectional RNN and logic of the cRNN is a unidirectional RNN, wherein each of the logic of the eRNN and the logic of the cRNN include a three-layer gate recurrent unit (GRU) with a hidden state size of 512.

12. The non-transitory, computer-readable medium of claim 9, wherein the instructions that, when executed, further cause the one or more processors of the one or more servers to:
execute the generator logic to determine utterance attributes from the dialogue utterance, wherein the utterance attributes include:
one or more of a speaker identity, a speaker background, a speaker location, a speaker preference, a speaker sentiment, or a combination thereof.

13. The non-transitory, computer-readable medium of claim 9, wherein the discriminator logic that, when executed, further cause the one or more processors of the one or more servers to:
utilize a word-level adversarial discriminator to determine the response, wherein the word-level adversarial discriminator is a bidirectional recurrent neural network including a gate recurrent unit.

14. The non-transitory, computer-readable medium of claim 13, wherein the discriminator logic that, when executed, further cause the one or more processors of the one or more servers to:
obtain outputs of a forward cell and a backward cell of the bidirectional recurrent neural network for each word of the dialogue utterance;
concatenate the outputs of the forward cell and the backward cell; and
pass the concatenated outputs to a fully-connected layer having binary output, wherein the binary output is a probability that the word is from a ground truth given a past word and a future word of a sequence of words.

15. The non-transitory, computer-readable medium of claim 9, wherein the instructions that, when executed, further cause the one or more processors of the one or more servers to:
receive dialogue utterances via the network interface.

16. A computer-implemented method utilizing a generative adversarial network, the method comprising:
receiving, via a network interface, a dialogue utterance;
generating, using generator logic of the generative adversarial network, response candidates responsive to the dialogue utterance, wherein the generator logic of the generative adversarial network includes a context recurrent neural network (cRNN), an encoder recurrent neural network (eRNN), an attention recurrent neural network (aRNN), and a decoder recurrent neural network (dRNN), the cRNN is configured to concatenate a source attribute with an output of the eRNN to generate an initial state for the dRNN, and the dRNN is configured to use an output of the aRNN to generate the response candidates based on the initial state;
determining, by using discriminator logic, a response to the dialogue utterance from the response candidates; and
outputting, via the network interface, the response to the dialogue utterance to a user device.

17. The computer-implemented method of claim 16, further comprising:
receiving training samples and injected noise;
providing feedback related to one or more response generation parameters;
updating the one or more response generation parameters in the generator logic;
generating, based on the updated one or more response generation parameters, the response candidates based on the dialogue utterances; and
providing the generated response candidates to the discriminator logic.

18. The computer-implemented method of claim 16, further comprising:
determining, by the generator logic, utterance attributes from the dialogue utterance, wherein the utterance attributes include:
one or more of a speaker identity, a speaker background, a speaker location, a speaker preference, a speaker sentiment, or a combination thereof.

19. The computer-implemented method of claim 16, further comprising:
determining the response, by the discriminator logic, using a word-level adversarial discriminator, wherein the word-level adversarial discriminator is a bidirectional recurrent neural network with a number of units, and each unit of the number of units of the bidirectional recurrent neural network includes a gate recurrent unit.

20. The computer-implemented method of claim 19, further comprising:
obtaining outputs of a forward cell and a backward cell of the bidirectional recurrent neural network for each word of the dialogue utterance;
concatenating the outputs of the forward cell and the backward cell; and
passing the concatenated outputs to a fully-connected layer having binary output, wherein the binary output is a probability that the word is from a ground truth given a past word and a future word of a sequence of words.

* * * * *